(12) United States Patent
Morita (10) Patent No.: US 11,238,890 B2
(45) Date of Patent: Feb. 1, 2022

(54) SERVO SIGNAL VERIFYING DEVICE FOR MAGNETIC RECORDING TAPE, SERVO WRITER, METHOD OF PRODUCING MAGNETIC RECORDING TAPE, AND SERVO SIGNAL READING HEAD

(71) Applicant: Sony Corporation, Tokyo (JP)

(72) Inventor: Hiroshi Morita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/051,376

(22) PCT Filed: Jan. 31, 2020

(86) PCT No.: PCT/JP2020/003577
§ 371 (c)(1),
(2) Date: Oct. 28, 2020

(87) PCT Pub. No.: WO2020/195150
PCT Pub. Date: Oct. 1, 2020

(65) Prior Publication Data
US 2021/0233558 A1  Jul. 29, 2021

(30) Foreign Application Priority Data

Mar. 27, 2019  (JP) .............................. JP2019-061332

(51) Int. Cl.
*G11B 5/008* (2006.01)
*G11B 5/02* (2006.01)
(Continued)

(52) U.S. Cl.
CPC ............ *G11B 5/00813* (2013.01); *G11B 5/02* (2013.01); *G11B 5/23* (2013.01); *G11B 5/5926* (2013.01);
(Continued)

(58) Field of Classification Search
None
See application file for complete search history.

(56) References Cited

U.S. PATENT DOCUMENTS 5,982,574 A * 11/1999 Leake .................... G11B 5/588
                                                    360/77.12
6,021,013 A *  2/2000 Albrecht ................ G11B 5/584
                                                       360/53
(Continued)

FOREIGN PATENT DOCUMENTS

JP     2000011347 A    1/2000
JP     2001006103 A    1/2001
(Continued)

OTHER PUBLICATIONS

Computer translation of JP2000-011347, Jan. 14, 2000.*
International Search Report issued in Application No. PCT/JP2020/003577, dated Mar. 24, 2020.

*Primary Examiner* — Tan X Dinh
(74) *Attorney, Agent, or Firm* — K&L Gates LLP (57) ABSTRACT

To provide a servo signal verifying device for verifying a servo signal of a magnetic recording tape with high recording density. The present technology provides a servo signal verifying device including: at least one servo signal reading head that reads a servo signal written to a servo band of a magnetic recording tape; a first amplifier that amplifies the servo signal read by the servo signal reading head; and a second amplifier that includes a low-pass filter with a cutoff frequency of 35 MHz or less and amplifies a signal amplified by the first amplifier. Further, the present technology provides also a servo writer that includes the servo signal verifying device, and a method of producing a magnetic recording tape using the servo signal verifying device. Further, the present technology provides also a servo signal reading head constituting the servo signal verifying device.

13 Claims, 8 Drawing Sheets

(51) Int. Cl.
*G11B 5/23* (2006.01)
*G11B 5/592* (2006.01)
*G11B 5/706* (2006.01)
*G11B 5/584* (2006.01)
*G11B 5/588* (2006.01)

(52) U.S. Cl.
CPC .......... *G11B 5/70678* (2013.01); *G11B 5/584* (2013.01); *G11B 5/588* (2013.01)

(56) References Cited

U.S. PATENT DOCUMENTS

| | | | | |
|---|---|---|---|---|
| 7,016,143 | B2 * | 3/2006 | Kirschenbaum | G11B 5/584 29/603.09 |
| 7,106,544 | B2 * | 9/2006 | Dugas | G11B 5/00813 360/121 |
| 7,119,976 | B2 * | 10/2006 | Biskeborn | B82Y 10/00 360/53 |
| 7,206,170 | B2 * | 4/2007 | Yip | G11B 5/0083 360/121 |
| 7,672,076 | B2 * | 3/2010 | Nakao | G11B 5/584 360/77.12 |
| 9,953,671 | B1 * | 4/2018 | Wiputra | G11B 5/00813 |
| 2005/0117246 | A1 * | 6/2005 | Sueki | G11B 5/584 360/77.12 |
| 2005/0219734 | A1 | 10/2005 | Rothermel et al. | |
| 2006/0187569 | A1 * | 8/2006 | Tateishi | G11B 5/584 360/75 |
| 2009/0027800 | A1 | 1/2009 | Iwamoto et al. | |
| 2010/0033867 | A1 | 2/2010 | Kawabe | |
| 2015/0111066 | A1 * | 4/2015 | Terakawa | G11B 5/70 428/836.2 |
| 2017/0162220 | A1 * | 6/2017 | Nakashio | G11B 5/70621 |

FOREIGN PATENT DOCUMENTS

| | | |
|---|---|---|
| JP | 2002334401 A | 11/2002 |
| JP | 2005285312 A | 10/2005 |
| JP | 2009032325 A | 2/2009 |
| JP | 2010040099 A | 2/2010 |
| JP | 2011192356 A | 9/2011 |

* cited by examiner

SERVO SIGNAL VERIFYING DEVICE FOR MAGNETIC RECORDING TAPE, SERVO WRITER, METHOD OF PRODUCING MAGNETIC RECORDING TAPE, AND SERVO SIGNAL READING HEAD

TECHNICAL FIELD

The present technology relates to a servo signal verifying device, a servo writer, a method of producing a magnetic recording tape, and a servo signal reading head. More specifically, the present technology relates to a servo signal verifying device suitable for verifying a servo signal of a magnetic recording medium having a small magnetization amount, a servo writer including the servo signal verifying device, a method of producing a magnetic recording tape using the servo writer, and a servo signal reading head included in the servo signal verifying device.

BACKGROUND ART

Regarding a magnetic recording tape used as data storage for a computer, it is desired to improve the recording density of data. In order to improve the recording density, the track widths of data bands are becoming very narrow and also the track widths of servo bands are becoming very narrow. Further, in order to improve the recording density, magnetic materials contained in a magnetic layer of a magnetic recording tape have also been investigated, and for example, barium ferrite is used as the magnetic material in some cases.

Along with the improvement of the magnetic recording tape for the purpose of improving the recording density, a servo writer suitable for the improved magnetic recording tape is also required. For example, the following Patent Literature 1 discloses the invention relating to a servo writer for writing a servo signal to a servo band of a magnetic tape, and the servo writer has a particular configuration for keeping the output value of the servo signal in a predetermined range.

CITATION LIST

Patent Literature

Patent Literature 1: Japanese Patent Application Laid-open No. 2005-085328

DISCLOSURE OF INVENTION

Technical Problem

When the track widths of servo bands are narrowed as described above, the signal-to-noise (S/N) ratio of the servo signal can deteriorate. The deterioration of the S/N ratio can interfere with verification of the servo signal. Further, in the case of using barium ferrite as a magnetic material, the magnetization amount of the magnetic recording tape can be reduced to approximately 20 to 30% of that in the case of using acicular metal. The decreased magnetization amount can also interfere with verification of the servo signal. Thus, with the improvement of the magnetic recording tape for improving the recording density, verification of the servo signal has become difficult.

In this regard, it is a main object of the present technology to provide a new technique for verifying a servo signal of a magnetic recording tape having higher recording density.

Solution to Problem

The present inventors have found that the above-mentioned object can be solved by a servo signal verifying device having a particular configuration.

Specifically, the present technology provides a servo signal verifying device, including: at least one servo signal reading head that reads a servo signal written to a servo band of a magnetic recording tape; a first amplifier that amplifies the servo signal read by the servo signal reading head; and a second amplifier that includes a low-pass filter with a cutoff frequency of 35 MHz or less and amplifies a signal amplified by the first amplifier.

A depth of a gap of the servo signal reading head may be 40 μm or less.

The servo signal reading head may be an inductive head.

A length of a wiring connecting the first amplifier and the servo signal reading head to each other may be 10 cm or less.

The first amplifier may be attached to the servo signal reading head.

A track width of the servo band may be 150 μm or less.

The magnetic recording tape may include a magnetic layer containing barium ferrite.

Of the gap of the servo signal reading head, a gap width of a center region may be wider than gap widths of both end portions.

The servo signal reading head may read a servo signal on the basis of magnetic flux changes in gap portions of both the end portions.

Further, the present technology provides also a servo writer, including: a servo signal verifying device including at least one servo signal reading head that reads a servo signal written to a servo band of a magnetic recording tape, a first amplifier that amplifies the servo signal read by the servo signal reading head, and a second amplifier that includes a low-pass filter with a cutoff frequency of 35 MHz or less and amplifies a signal amplified by the first amplifier.

In addition, the present technology provides also a method of producing a magnetic recording tape on which a servo signal is recorded, including: a recording step of recording the servo signal on the magnetic recording tape; and a verification step of verifying the servo signal recorded in the recording step, in which the verification step is executed by using a servo signal verifying device including at least one servo signal reading head that reads a servo signal written to a servo band of a magnetic recording tape, a first amplifier that amplifies the servo signal read by the servo signal reading head, and a second amplifier that includes a low-pass filter with a cutoff frequency of 35 MHz or less and amplifies a signal amplified by the first amplifier.

In addition, the present technology provides also a servo signal reading head that is used to verify a servo signal written to a servo band of a magnetic recording tape, including: an amplifier that amplifies the servo signal.

The servo signal reading head may be used in conjunction with a different amplifier that further amplifies a signal obtained by the amplification of the servo signal by the amplifier and includes a low-pass filter with a cutoff frequency of 35 MHz or less.

A depth of a gap of the servo signal reading head may be 40 μm or less.

The servo signal reading head may be an inductive head.

The amplifier that amplifies the servo signal may be attached to the servo signal reading head.

The servo signal reading head may include a gap, a gap width of a center region being wider than gap widths of both end portions in the gap.

The servo signal reading head may read a servo signal on the basis of magnetic flux changes in gap portions of both the end portions.

MODE(S) FOR CARRYING OUT THE INVENTION

Hereinafter, suitable embodiments for carrying out the present technology will be described. Note that the embodiments described below represent typical embodiments of the present technology, and the scope of the present technology is not construed as being limited only to these embodiments. Note that the description of the present technology will be given in the following order.
1. First embodiment (servo signal verifying device)
(1) Description of first embodiment
(2) Another example of first embodiment (example of head)
2. Second embodiment (servo writer)
3. Third embodiment (method of producing magnetic recording tape)
4. Fourth embodiment (servo signal reading head)
(1) First example of fourth embodiment (servo signal reading head including amplifier)
(2) Second example of fourth embodiment (servo signal reading head where the gap width is not constant)
5. Example 1. First Embodiment (Servo Signal Verifying Device)

(1) Description of First Embodiment

The servo signal verifying device according to the present technology includes: at least one servo signal reading head; and two amplifiers that amplify a servo signal read by the servo signal reading head. Of the two amplifiers, a first amplifier amplifies a servo signal read by the servo signal reading head and a second amplifier includes low-pass filter with a cutoff frequency of 35 MHz or less and further amplifies the signal amplified by the first amplifier. By configuring the servo signal verifying device according to the present technology, it is possible to verify a servo signal of a magnetic recording tape where a servo band width is narrow and the magnetization amount derived from the servo band is small with high accuracy.

An example of a magnetic recording tape on which verification processing by the servo signal verifying device according to the present technology is performed and an example of a servo writer including the servo signal verifying device according to the present technology will be described in the following (1-1) and (1-2), and the servo signal verifying device according to the present technology will be described in the following (1-3).

(1-1) Magnetic Recording Tape

Figure 1:
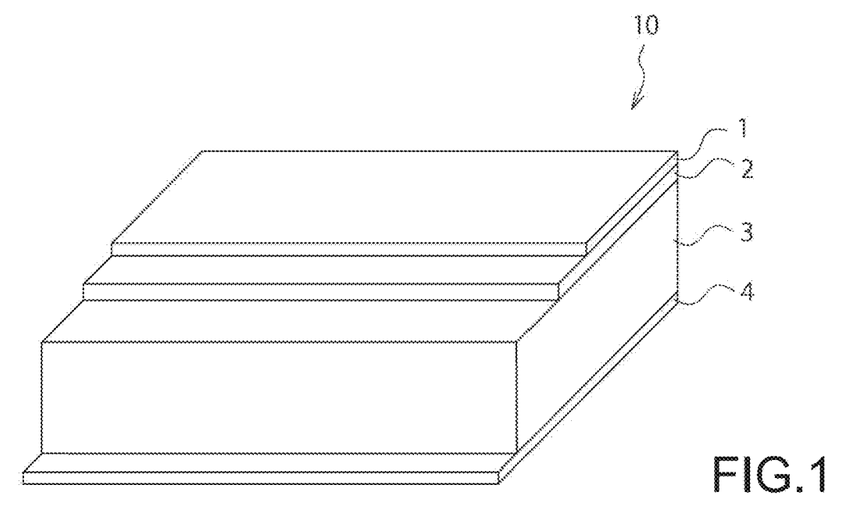
FIG. 1 is a schematic diagram showing an example of a layer structure of a magnetic recording tape.

FIG. 1 shows an example of a layer structure of a magnetic recording tape to be verified by the servo signal verifying device according to the present technology. A magnetic recording tape 10 shown in FIG. 1 can have a layer structure including, for example, a magnetic layer 1, a non-magnetic layer 2, a baser layer 3, and a back layer 4 in the stated order. The magnetic recording tape 10 is favorably one on which perpendicular magnetic recording has been performed.

A servo signal is written to the magnetic layer 1. The servo band having the servo signal enables the magnetic head to be positioned with respect to the magnetic recording tape 10 with high accuracy. The servo band realizes accurate data-writing and reading.

Figure 2:
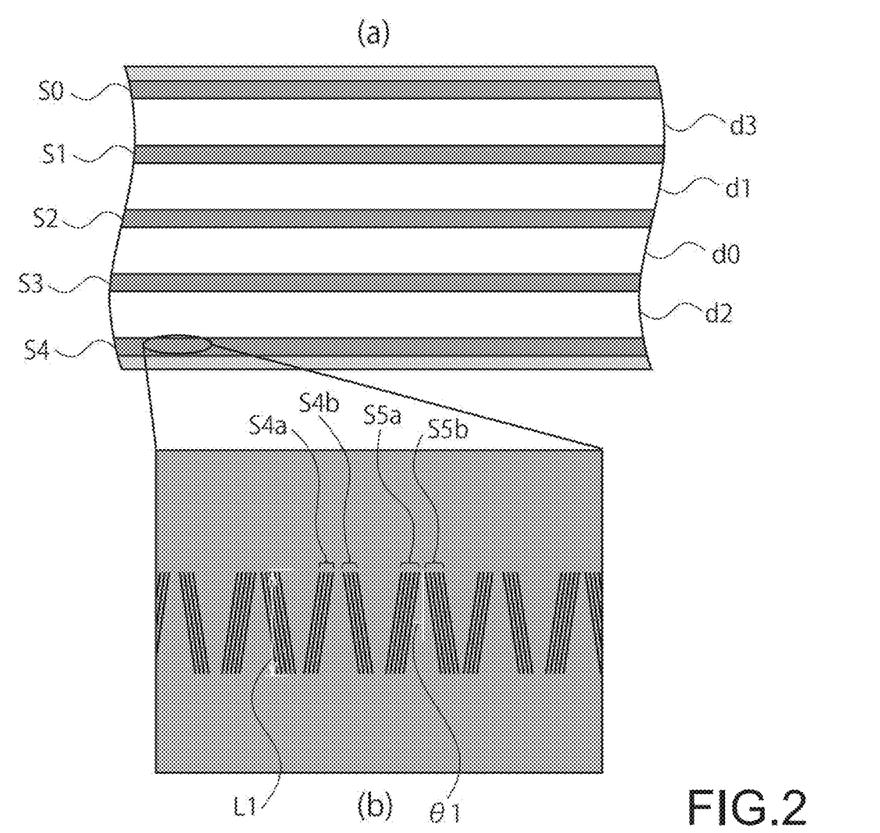
FIG. 2 is a diagram showing an example of a servo signal written to a magnetic layer.

An example of the servo signal to be written to the magnetic layer will be described below with reference to FIG. 2. FIG. 2 is a schematic diagram of data bands and servo bands formed in the magnetic layer of the magnetic recording tape 10. As shown in Part (a) of FIG. 2, the magnetic layer includes four data bands d0 to d3. The magnetic layer includes a total of five servo bands S0 to S4 so that each of the data bands is sandwiched between two servo bands. As shown in Part (b) of FIG. 2, each of the servo bands has repeating frame units including five servo signals S5a inclined at a predetermined angle θ1, five servo signals S5b inclined at the same angle in a direction opposite to these signals S5a, four servo signals S4a inclined at the predetermined angle θ1, and four servo signals S4b inclined at the same angle in a direction opposite to these signals S4a. The angle θ1 is, for example, 5° to 20°, and can be particularly 10° to 15°.

A track width L1 of each of the servo bands S0 to S4 is, for example, 250 μm or less, particularly, 200 μm or less, more particularly, 150 μm or less, 130 μm or less, or 110 μm or less. The servo signal verifying device according to the present technology is capable of verifying a servo signal from a servo band with such a narrow track width with high accuracy. The track width L1 may be, for example, 70 µm or more, particularly, 80 µm or more, more particularly, 90 µm or more.

As described above, in order to improve the recording density, the track width of the servo band can be set very narrow. For example, in the seventh-generation format of the LTO standard for a magnetic recording tape, the track width L1 of the servo band is 95.5 µm. This is approximately half the 190.9 µm in the sixth generation format of the same standard, the output of the magnetic head may be lowered, and the S/N ratio of the servo signal may be deteriorated.

The servo signal verifying device according to the present technology is capable of verifying a servo signal from a servo band with such a narrow track width with high accuracy.

Figure 17:
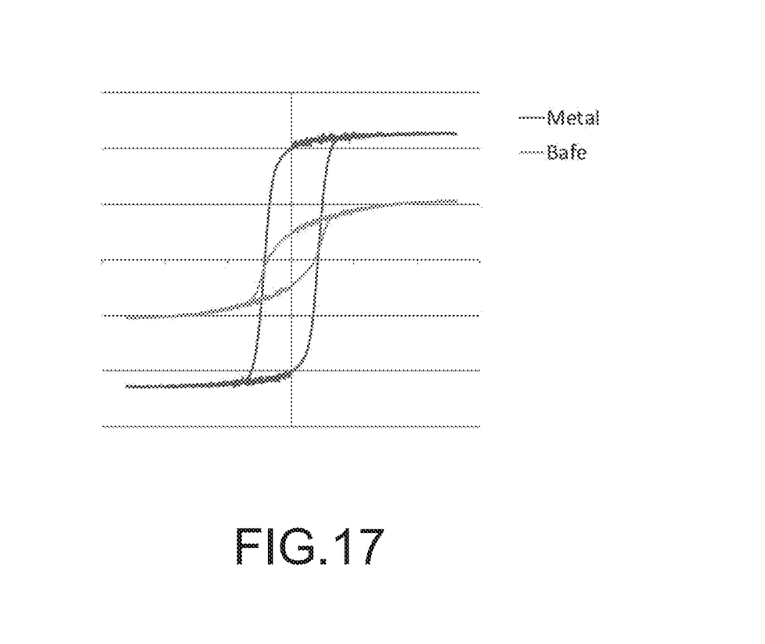
FIG. 17 is a diagram showing a magnetization amount of a magnetic recording tape.

Further, as described above, in the case of using barium ferrite as the magnetic material, the magnetization amount of the magnetic recording tape can be reduced to approximately 20 to 30% of that in the case of using acicular metal as shown in FIG. 17.

The servo signal verifying device according to the present technology is capable performing verification with high accuracy even if the servo output of the magnetic recording tape is low.

The total thickness of the magnetic recording tape 10 is, for example, 6.0µ or less, particularly, 5.8µ or less, more particularly, 5.6 µm or less, 5.5 µm, 5.4 µm or less, 5.3 µm or less, 5.2 µm or less, 5.0 µm or less, 4.8 µm or less, or 4.6 µm or less. The total thickness can be, for example, 3.0 µm or more, particularly, 3.5 µm or more. The servo signal verifying device according to the present technology can be used for verifying a servo signal of a such a thin magnetic recording tape.

The magnetic recording tape 10 includes a perpendicularly magnetic layer or a longitudinally oriented (in-plane oriented) magnetic layer, and can favorably include a perpendicularly magnetic layer. In the case where the magnetic recording tape includes a perpendicularly oriented magnetic layer, the degree of perpendicular orientation of the magnetic layer is favorably 60% or more, more favorably, 65% or more, still more favorably 70% or more.

The servo signal verifying device according to the present technology is suitable for verifying a magnetic recording tape including the magnetic layer, i.e., can be used for verifying a servo signal of the magnetic recording tape.

In accordance with an embodiment of the present technology, the magnetic recording tape 10 may include a magnetic layer formed by coating. The magnetic layer may contain a magnetic powder. Examples of magnetic particles forming the magnetic powder include, but not limited to, barium ferrite (BaFe), metal (particularly, acicular metal), epsilon-type iron oxide (ε-iron oxide), gamma hematite, magnetite, chromium dioxide, cobalt-deposited iron oxide, hexagonal ferrite, Co ferrite, and strontium ferrite. For example, the magnetic layer may contain barium ferrite.

In accordance with another embodiment of the present technology, the magnetic layer formed by sputtering. The magnetic layer may contain magnetic crystal grains. The magnetic crystal grains forming the magnetic layer may be, for example, a Co-based alloy, more specifically, a CoCrPt-based alloy containing at least Co, Cr, and Pt. The CoCrPt-based alloy may further contain a different element. Examples of the different element include one or two elements selected from the group consisting of Ni and Ta.

The servo signal verifying device according to the present technology is applicable also to both the servo band of the above-mentioned magnetic layer formed by coating and the servo band of the above-mentioned magnetic layer formed by sputtering.

The non-magnetic layer of the magnetic recording tape may contain a non-magnetic powder. The non-magnetic powder may be, for example, at least one selected from inorganic particles and organic particles. The inorganic particles may include, for example, one or a combination of two or more selected from metals, metal oxides, metal carbonates, metal sulfates, metal nitrides, metal carbides, and metal sulfides. More specifically, the inorganic particles may be, for example, one or two or more selected from iron oxyhydroxide, hematite, titanium oxide, and carbon black.

The back layer of the magnetic recording tape may also contain the non-magnetic powder described above with respect to the non-magnetic layer.

The base layer of the magnetic recording tape may be formed of at least one of, for example, a polyester-based resin, a polyolefin-based resin, a cellulose derivative, a polyvinyl-based resin, or a polyamide-based resin. The base layer is favorably formed of a polyester-based resin, and may be formed of, for example, PEN (polyethylene naphthalate), PET (polyethylene terephthalate), or PBT (polybutylene terephthalate).

(1-2) Servo Writer

Figure 3:
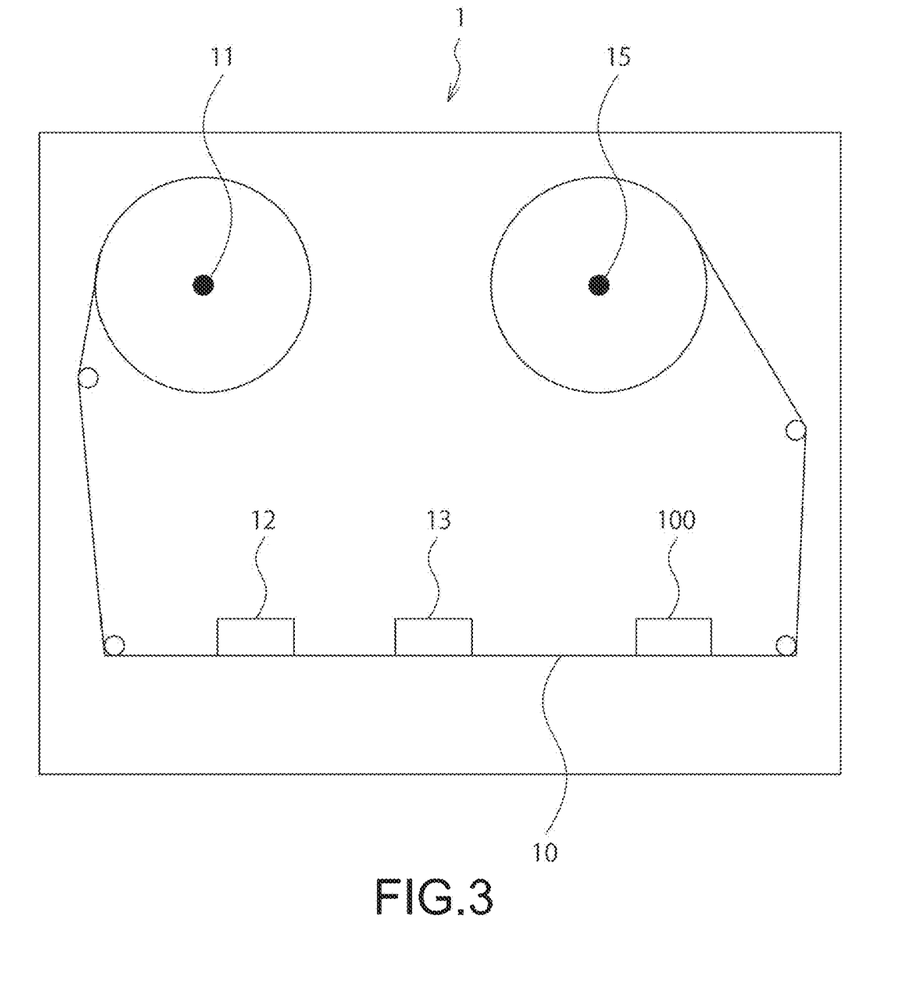
FIG. 3 is a schematic diagram showing an example of a servo writer.

FIG. 3 is a schematic diagram showing an example of a servo writer. A servo writer 1 shown in FIG. 3 is a device for writing a servo signal to the magnetic recording tape 10.

The servo writer 1 includes a feeding roller 11, a pre-processing unit 12, a servo signal recording device 13, a servo signal verifying device 100 according to the present technology, and a take-up roller 15. Further, the servo writer 1 may include a control unit that controls these components included in the servo writer 1, a storage unit that stores various programs for controlling these components by the control unit and data, a display unit that displays data, and the like. Note that the control unit, the storage unit, and the display unit are not shown in FIG. 3.

The magnetic recording tape 10 fed from the feeding roller 11 are subject to a processing step by the pre-processing unit 12, a servo signal recording processing step by the servo signal recording device 13, and a verification step by the servo signal verifying device 100 according to the present technology, and is finally wound up by the take-up roller 15. In the present specification, regarding the components included in the servo writer 1, the component closer to the feeding roller 11 is referred to as the upstream component and the component closer to the take-up roller 15 is referred to as the downstream component from the viewpoint of the order of the above-mentioned steps.

The feeding roller 11 is rotatable and feeds the magnetic recording tape 10 prior to servo signal recording as it rotates. The feeding roller 11 may be driven by, for example, control by the control unit. A magnetic recording tape on which a servo signal is to be recorded is wounded on the feeding roller 11 prior to servo signal recording processing.

The pre-processing unit 12 is located upstream of the servo signal recording device 13. The pre-processing unit 12 may include, for example, a magnetic head that generates a magnetic field in one direction by applying a direct current. The pre-processing unit 12 magnetizes the magnetic layer of the magnetic recording tape 10 uniformly by the magnetic field in the one direction. The processing by the pre-processing unit 12 is also called demagnetization. As the magnetic head included in the pre-processing unit 12, a magnetic head known in the technical field may be used. Alternatively, the pre-processing unit 12 may include a permanent magnet that is rotatable about the width direction of the magnetic recording tape 10 as a central axis of rotation. The permanent magnet applies a magnetic field to the entire magnetic layer by a direct magnetic field, demonstrating the entire magnetic layer. The permanent magnet may be as described in Japanese Patent Laid-Open No. 2014-199706.

The servo signal recording device 13 is located downstream of the pre-processing unit 12 and upstream of the servo signal verifying device 100. The servo signal recording device 13 includes a magnetic head for writing a servo signal to the magnetic recording tape 10. As the magnetic head, a magnetic head known in the technological field may be used.

The servo signal verifying device 100 according to the present technology may be located downstream of the servo signal recording device 13. The servo signal verifying device 100 includes a magnetic head for reading a servo signal written to the magnetic recording tape 10 by the servo signal recording device 13. The configuration of the servo signal verifying device 100 will be described in the following (1-3).

The take-up roller 15 is rotatable, and winds up the magnetic recording tape 10 that has been verified by the servo signal verifying device 100 as it rotates. The take-up roller 15 may be driven by, for example, control by the control unit. The verified magnetic recording tape 10 on which a servo signal has been recorded is wound on the take-up roller 15.

The control unit may control the rotational velocity of the feeding roller 11 and the take-up roller 15 to control the travelling velocity of the magnetic recording tape 10.

The servo writer 1 may further include a marking signal recording device (not shown). The marking signal recording device may be located downstream of the servo signal verifying device 100 and upstream of the take-up roller 15. The marking signal recording device may record the marking signal of the magnetic recording tape in accordance with the verification result by the servo signal verifying device 100. The marking signal may be a signal indicating a verification result.

(1-3) Servo Signal Verifying Device

Figure 4:
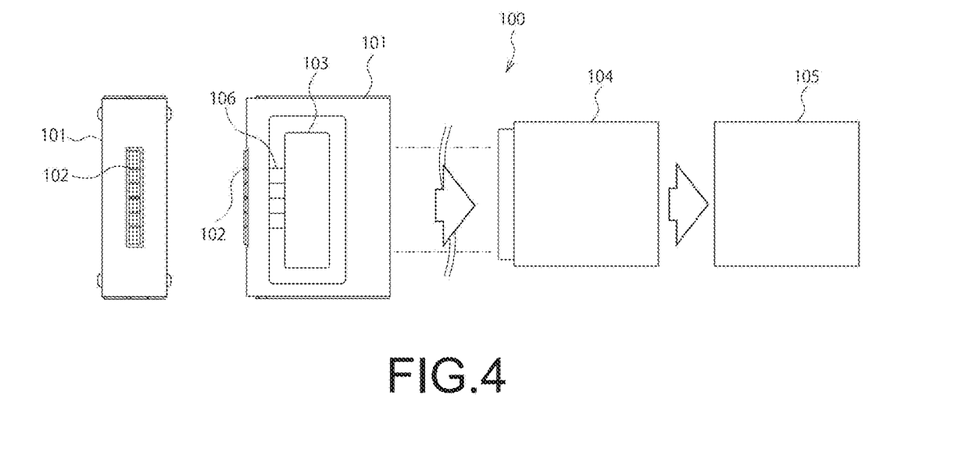
FIG. 4 is a schematic diagram showing a configuration example of a servo signal verifying device according to the present technology.

The servo signal verifying device 100 according to the present technology will be described below with reference to FIG. 4. As shown in FIG. 4, the servo signal verifying device 100 includes a servo signal reading head 101, a first amplifier 103 that amplifies the servo signal read by the servo signal reading head 101, and a second amplifier 104 that amplifies the signal amplified by the first amplifier 103. The servo signal verifying device 100 can further include a signal determination unit 105 that determines the signal obtained by the amplification by the second amplifier 104.

Servo Signal Reading Head

The servo signal reading head 101 reads the servo signal recorded on the servo band of the magnetic recording tape 10 and transmits the read signal to the first amplifier 103. The servo signal reading head 101 favorably includes the first amplifier 103, and more favorably, the first amplifier 103 may be attached to the servo signal reading head 101.

The servo signal reading head 101 is favorably an inductive head. The inductive head can acquire, as a servo signal, the voltage induced as the magnetic recording tape 10 moves over the gap of the servo signal reading head 101 (particularly, while contacting the head 101). In the case where the servo signal reading head 101 is an inductive head, there is no need to worry about ESD (Electro-Static Destruction) that can occur when using a drive head.

Hereinafter, a more specific structure of the servo signal reading head when the servo signal reading head 101 is an inductive head will be described.

Figure 5:
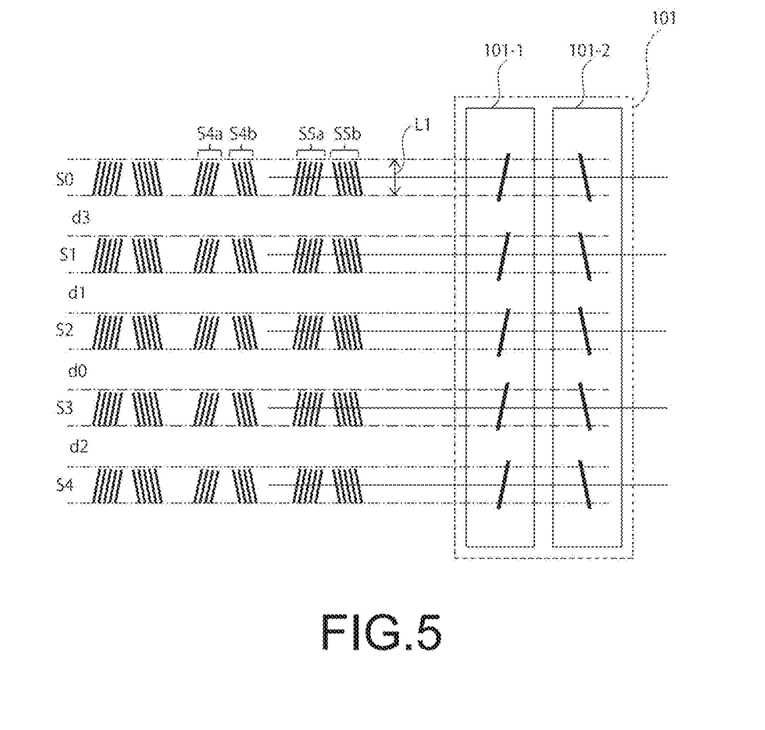
FIG. 5 is a diagram showing reading of a servo signal by a head.

As shown in FIG. 5, for example, one servo signal verifying device 100 can include two servo signal reading heads 101-1 and 101-2. One servo signal reading head 101-1 can read, for example, the five servo signals S5a and four servo signals S4a described above, and the other servo signal reading head 101-2 can read the five servo signals S5b and the four servo signals S4b.

Each of the servo signal reading heads 101-1 and 101-2 may include the same number of head gaps as the number of servo bands. In the case where the number of servo bands is five, each of the servo signal reading heads 101-1 and 101-2 may include five head gaps 102 as shown in, for example, FIG. 6. Note that the number of head gaps is not limited to five, and may be, for example, 3 to 10, particularly 4 to 6.

Figure 7:
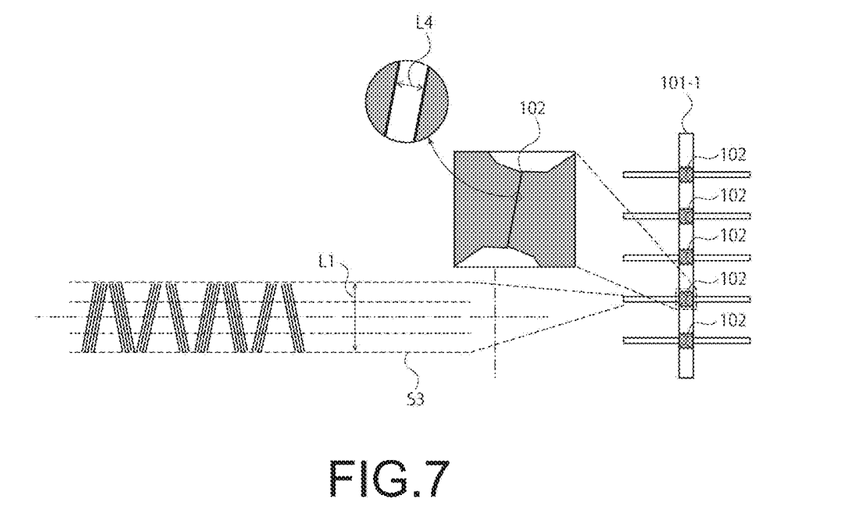
FIG. 7 is a diagram showing a configuration example of the head gap.

As shown in FIG. 7, each of the five head gaps 102 included in the servo signal reading head 101-1 reads a servo signal of each of the five servo bands. Also each of the five head gaps included in the servo signal reading head 101-2 reads a servo signal of each of the five servo bands similarly.

A track width L2 (see FIG. 6) of the head gap 102 is favorably greater than or equal to the track width L1 (see FIG. 7) of the servo band, and more favorably greater than more the track width L1. When the track width L2 is equal to or larger than the track width L1, a defect in which a servo signal is missing in a part of the servo band in the width direction can be detected more reliably. For example, in the drive head, since a servo signal based on a part of the servo band in the width direction is read, the defect is not be detected in some cases.

Figure 6:
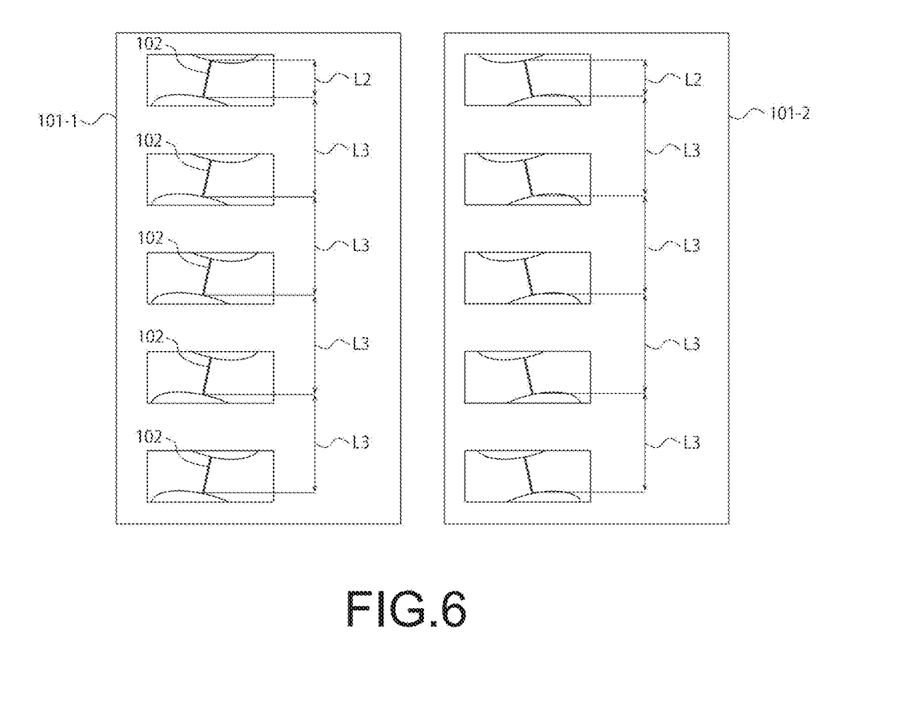
FIG. 6 is a diagram showing a configuration example of a head gap.

The track width L2 of the head gap 102 may be, for example, 1.05 to 2 times the track width L1 of the servo band, and favorably 1.1 to 1.5 times.

In accordance with an embodiment of the present technology, the track width L2 of the head gap can be, for example, 100 µm to 200 µm, favorably 100 µm to 150 µm, and more favorably 110 µm to 140 µm. With the track width L2 within the above-mentioned numerical range, it is possible to cope with, for example, a magnetic recording tape in the seventh-generation of the LTO standard in which the track width L1 of the servo band is 95.5 µm.

The azimuth angle of the head gap 102 may be, for example, 5° to 20°, favorably 10° to 15°, and more favorably 11° to 13°. Note that in the case where one servo signal verifying device includes two servo signal reading heads as described above, the azimuth angle of the one servo signal reading head 101-1 is +5° to +20°, favorably +10° to +15°, and more favorably +11° to +13°, and the azimuth angle of the other servo signal reading head 101-2 may be −5° to 20°, favorably −10° to 15°, and more favorably −11° to 13°.

A track pitch L3 of the head gap 102 may be appropriately set depending on the intervals of the servo bands, and may be, for example, 2000 µm to 4000 µm, favorably 2500 µm to 3500 µm, and more favorably 2600 µm to 3000 µm.

A gap width L4 (see FIG. 7) of the head gap 102 may be constant throughout the gap.

The gap width L4 of the head gap 102 may be, for example, 0.2 µm to 0.8 µm, favorably 0.3 µm to 0.7 µm, more favorably 0.4 µm to 0.6 µm.

The servo signal reading head 101 may have an inductance at 3 MHZ of, for example, 30 µH to 100 µH, favorably 40 µH to 90 µH, and more favorably 50 µH to 80 µH. The inductance is measured by an impedance analyzer (HP, 4192A) or a device equivalent thereto.

Figure 8:
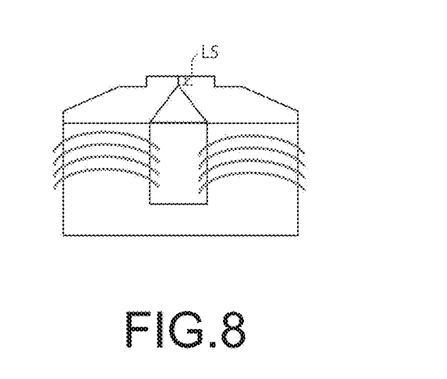
FIG. 8 is a diagram showing a configuration example of a servo signal reading head.

The coil of the servo signal reading head 101 may be, for example, a two-coil balanced coil as shown in FIG. 8.

In accordance with a favorable embodiment of the present technology, the depth of the gap of the servo signal reading head 101 is favorably 40 µm or less, more favorably 35 µm or less, and may be still more favorably 30 µm or less or 25 µm or less. In the present specification, the depth means the depth of the head gap and is the length L5 shown in FIG. 8. With a depth equal to or less than the above-mentioned upper limit value, the sensitivity of the servo signal reading head 101 increases, and verification can be performed with high accuracy even in a magnetic recording tape having a small magnetization amount.

The depth of the gap of the servo signal reading head 101 may be, for example, 5 µm or more, and can be favorably 6 µm or more, and more favorably 7 µm or more. In the case where the depth L5 is too small, there is a possibility that the degradation of the magnetic properties of the depth L5 portion reduces the output or the depth becomes 0 µm due to the machine dimensional variations between the plurality of head gaps, which can interfere with verification.

The servo signal reading head 101 may be provided with at least one hole for introducing, for example, cooling-air into the head.

The servo signal reading head 101 may be produced by, for example, the method described in Japanese Patent Application Laid-open No. 1990-35613.

First Amplifier

The first amplifier 103 amplifies the servo signal read by the servo signal reading head 101. The first amplifier 103 transmits the amplified signal (hereinafter, referred to also as the "first amplified signal") to the second amplifier 104.

The first amplifier 103 may be attached to favorably the servo signal reading head 101. For example, the first amplifier 103 may be attached to a surface of a casing of the servo signal reading head 101 or may be included in the casing of the servo signal reading head 101. For example, as shown in FIG. 4, the first amplifier 103 may be attached to the surface of the servo signal reading head 101 (e.g., in the exposed state). Alternatively, the first amplifier 103 may be disposed within the casing of the servo signal reading head 101.

By attaching the first amplifier 103 to the servo signal reading head 101, it is possible to reduce the effect on the servo signal due to external jumping noise, for example. This is thought to be due to the presence of the first amplifier 103 in the vicinity of the servo signal reading head 101. Examples of the source of the jumping noise include the servo signal recording device 13 in the servo writer 1. The jumping noise can have a significant effect on the servo signal reading of, particularly, the magnetic recording tape having a small magnetization amount. The fact that the first amplifier 103 is attached to the servo signal reading head 101 contributes to the improvement of the S/N ratio of the servo signal of the magnetic recording tape.

In the case where the servo signal verifying device 100 includes the two servo signal reading heads 101-1 and 101-2 as described above, a first amplifier can be attached to each of these servo signal reading heads.

The length of a wiring 106 connecting the first amplifier 103 and the servo signal reading head 101 is favorably 10 cm or less, more favorably 3 cm or less, and still more favorably 2 cm or less. When the length of the connection wiring is equal to or less than the above-mentioned upper limit value, the effect of the jumping noise can be effectively reduced. In the case where the first amplifier 103 is attached to the servo signal reading head 101, the length of the wiring 106 is particularly favorably 3 cm or less and more favorably 2 cm or less.

The length of the wiring may be, for example, 0.5 cm or more, particularly 1 cm or more. In the case where the wiring is too short, it is difficult to connect the first amplifier 103 and the servo signal reading head 101 to each other in some cases.

The first amplifier 103 may include, for example, an inverting amplifier circuit or a non-inverting amplifier circuit.

The gain of the first amplifier 103 is, for example, 5 dB to 55 dB, favorably 10 dB to 50 dB, and more favorably 15 dB to 45 dB. An amplifier having a gain within the above-mentioned numerical range is suitable as the first amplifier 103 from the viewpoint of reducing the effect of the jumping noise and not giving an excessive input signal to the second amplifier 104.

Second Amplifier

The second amplifier 104 receives and amplifies the first amplified signal transmitted from the first amplifier. The second amplifier 104 transmits the signal amplified by the amplifier (hereinafter, referred to also as the "second amplified signal") to, for example, the control unit (particularly, a signal determination unit described below) of the servo writer.

In the case where the servo signal verifying device 100 includes the two servo signal reading heads 101-1 and 101-2 as described above, a second amplifier may be connected to the first amplifier attached to each of these servo signal reading heads. That is, the servo signal verifying device 100 may include the servo signal reading head 101-1, a first amplifier mounted on the head 101-1, a second amplifier connected to the first amplifier, the servo signal reading head 101-2, a first amplifier mounted on the head 101-2, and a second amplifier connected to the first amplifier.

The second amplifier 104 includes a low-pass filter with a cutoff frequency of 35 MHz or less, favorably 30 MHz or less, more favorably 25 MHz or less, and still more favorably 20 MHz or less. This low-pass filter makes it possible to remove noises of frequencies exceeding the above-mentioned upper limit value, and to improve the S/N ratio of the signal used for verification. For example, the ratio of noise/servo signal output can be 50% or less. This makes it possible to accurately determine the servo signal of the magnetic recording tape having a small magnetization amount.

In the servo signal verifying device 100, the servo signal is amplified by the first amplifier 103, and the first amplified signal obtained by the amplification is denoised and amplified by the second amplifier 104 to generate a second amplified signal. The second amplified signal is used to perform verification in, for example, the control unit of the servo writer 1. This makes it possible to more accurately verify the servo signal of the magnetic recording medium having a small magnetization amount.

The second amplifier 104 may include, for example, an amplifier circuit including a primary low-pass filter, an amplifier circuit including a secondary low-pass filter, an amplifier circuit including a tertiary low-pass filter, or an amplifier circuit including a quaternary low-pass filter.

The gain of the second amplifier 104 is, for example, 5 dB to 55 dB, favorably 10 dB to 55 dB, and more favorably 20 dB to 55 dB. An amplifier having a gain within the above-mentioned numerical range is suitable as the second amplifier 104 from the viewpoint of determining that the servo signal voltage is higher or lower than the reference voltage of a comparator, i.e. from the viewpoint of comparing with the threshold value.

Signal Determination Unit

The signal determination unit 105 determines whether or not a signal has been normally recorded on the magnetic recording tape 10.

The signal determination unit 105 determines, for example, whether or not the second amplified signal transmitted from the second amplifier 104 satisfies a predetermined criterion. More specifically, the signal determination unit 105 may determine whether or not the second amplified signal satisfies the predetermined criterion on the basis of one or more selected from the group consisting of amplitudes, wave heights, and waveforms of the second amplified signal. The predetermined criterion may be set on the basis of, for example, the servo signal to be recorded by the servo signal recording device 13 or specifications of the magnetic recording tape 10.

For example, the signal determination unit 105 may determine whether or not a servo signal has been normally recorded on the magnetic recording tape 10 on the basis of the number of amplitudes or wave heights of the second amplified signal, which are greater than or equal to a predetermined threshold value.

The determination processing by the signal determination unit 105 can be realized by, for example, the control unit included in the servo writer 1. The control unit may execute various types of processing (e.g., the signal determination processing) in cooperation with hardware and software.

The control unit may include, for example, an A/D conversion unit and a CPU. The control unit may further include a ROM and a RAM. The A/D conversion unit is a circuit for converting the second amplified signal to a digital signal. The CPU can perform the determination processing by using the digital signal obtained by converting the second amplified signal by the A/D converter. The CPU can read a program such as firmware stored in, for example, the ROM and RAM to perform the determination processing. Further, the processing by the control unit may be executed by, for example, a function mounted on ASIC.

(2) Another Example of First Embodiment (Example of Head)

In accordance with an embodiment of the present technology, of the gap of the servo signal reading head, the gap width of the center region may be wider than the gap widths of both end portions. In this embodiment, the servo signal read by the servo signal reading head may be based on magnetic flux changes in the gaps of the both end portions. More particularly, the servo signal is not based on magnetic flux changes in the gap portion of the central region. This embodiment will be described below with reference to FIG. 9.

Figure 9:
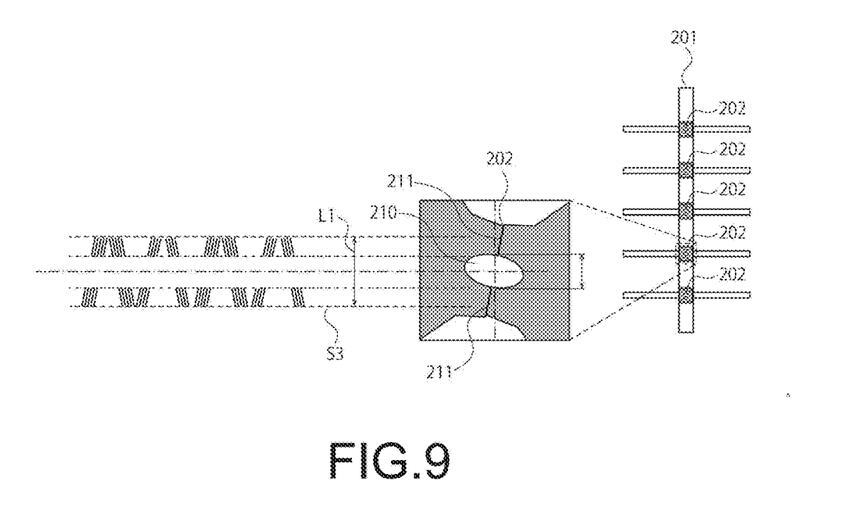
FIG. 9 is a diagram showing a configuration example of a head gap.

A servo signal reading head 201 shown in FIG. 9 includes five head gaps 202. Each of the five head gaps 202 reads each of the five servo bands of the magnetic recording tape 10. In the head gap 202, the gap width of a center region 210 is wider than the gap widths of both end portions 211. The gap width of the center region 210 may be set so as not to contribute to the reading of a servo signal. More specifically, even when the servo band of the magnetic recording tape 10 moves over the head gap 202, the center region 210 does not produce magnetic flux changes that affect the servo signal.

The shape of the center region 210 (the shape of the space of the center region 210) may be, but is not limited to, an elliptical shape as shown in FIG. 9. For example, it may be circular or rectangular.

The gap width of each of the both end portions 211 may be, for example, 0.2 µm to 0.8 µm, favorably 0.3 µm to 0.7 µm, and more favorably 0.4 µm to 0.6 µm.

This gap having such a structure exhibits the effect of improving the quality of a servo signal read by a servo signal reading head.

In order to describe the effect, assumption is made that, for example, dust adheres to the magnetic head in the servo signal recording device 13 and the track width L1 of the servo band becomes narrower than the target width. In this case, there is a possibility that the head having the gap described in the above (1) (the head having the gap width constant throughout the gap) cannot detect the difference in the servo signal depending on the ratio between the narrowed track width and the normal track width L1, in other words, depending on the ratio of the power drop due to the unrecorded portion caused by the narrowed track width. Meanwhile, in this embodiment, when it becomes narrower than the normal track width L1, since the ratio of the unrecorded portion in the gap region contributing to the servo signal increases, the reduction of the power becomes large, and the defect of the servo signal can be detected more reliably.

2. Second Embodiment (Servo Writer)

The present technology provides also a servo writer including the servo signal verifying device described in the above 1. Since all of the descriptions regarding the servo writer in (1-2) of the above 1. apply to the servo writer according to the present technology as well, the description regarding the servo writer and the components thereof will be omitted.

3. Third Embodiment (Method of Producing Magnetic Recording Tape)

The present technology provides also a method of producing a magnetic recording tape on which a servo signal has been recorded. The production method includes: a recording step of recording a servo signal on a magnetic recording tape; and a verification step of verifying the servo signal recorded in the recording step. The verification step is performed using the servo signal verifying device described in 1.

In the production method according to the present technology, since a servo signal is verified with high accuracy even in the case where the magnetization amount of the magnetic recording tape is small and/or the servo band width is narrow, a magnetic recording tape on which a servo signal is not normally recorded can be detected more reliably. Since a magnetic recording tape on which a servo signal is not normally recorded can be detected more reliably, it is possible to increase the quality of a magnetic recording tape to be shipped. Further, in the case where a magnetic recording tape does not have predetermined quality for a servo signal, it is also possible to improve the yield by recording a servo signal again.

Figure 10:
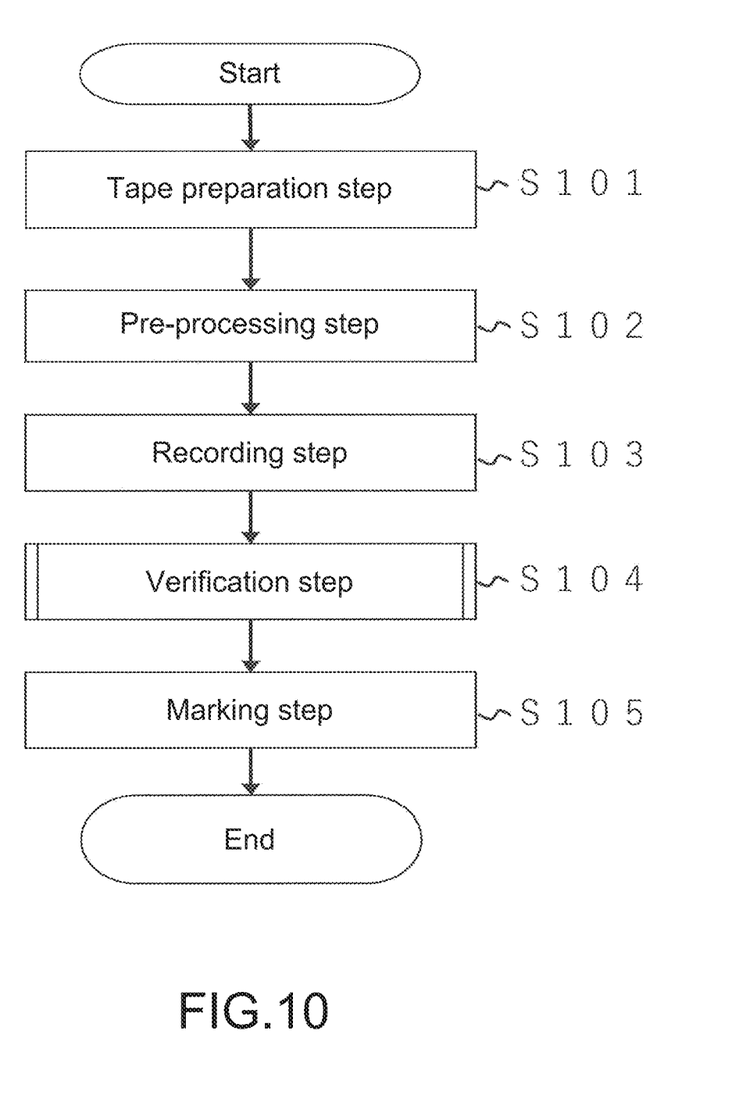
FIG. 10 shows an example of a flowchart of a production method according to the present technology.
Figure 11:
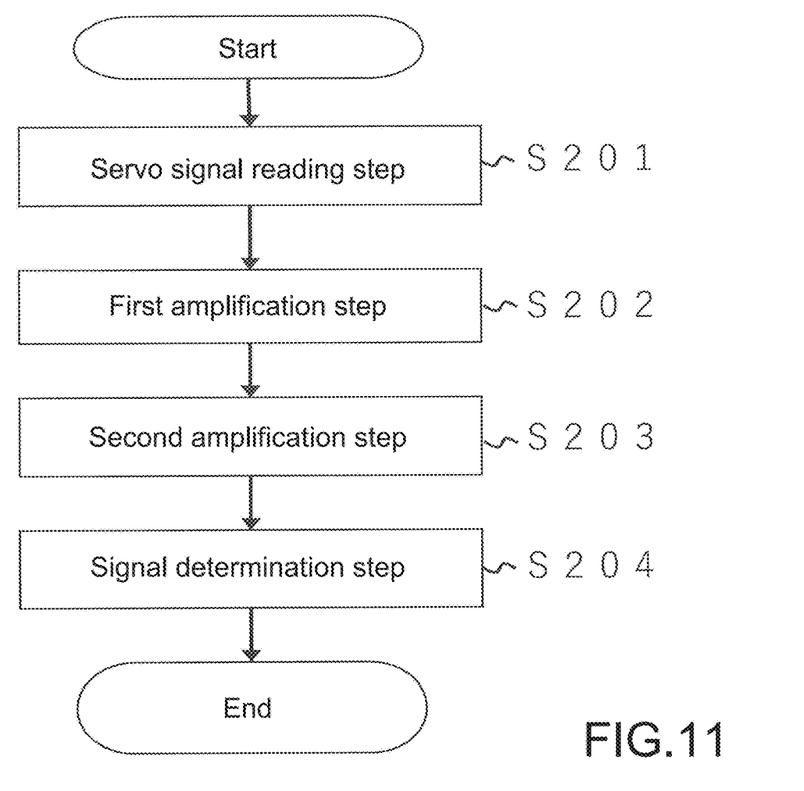
FIG. 11 shows an example of a flowchart of a verifying step included in the production method according to the present technology.

An example of the production method will be described with reference to FIGS. 3, 4A, 10, and 11. FIGS. 3 and 4A are diagrams as described above. FIG. 10 shows an example of a flowchart of the production method. FIG. 11 shows an example of a flowchart of the detail of the verification step in the production method.

As shown in FIG. 10, the production method according to the present technology can include a tape preparation step S101, a pre-processing step S102, a recording step S103, a verification step S104, and a marking step S105.

A magnetic recording tape is prepared in the tape preparation step of Step S101. The magnetic recording tape may be, for example, the magnetic recording tape 10 described in (1) of the above 1, or may be a magnetic recording tape known in the technological field. The known magnetic recording tape may be produced by, for example, the production method described in WO 2015/025465. The magnetic recording tape may be one on which no servo signal is recorded, or may be one on which a servo signal is recorded.

In the tape preparation step of Step S101, a magnetic recording tape is wound in a pancake shape around the feeding roller 11 of the servo writer 1 shown in FIG. 3. The control unit of the servo writer 1 then causes the feeding roller 11 and the take-up roller 15 to rotate to feed the magnetic recording tape to the pre-processing unit 12.

In pre-processing step of Step S102, the magnetic head included in the pre-processing unit 12 uniformly magnetizes the magnetic layer of the magnetic recording tape. The magnetic recording tape demagnetized by the pre-processing unit 12 is fed to the servo signal recording device 13.

In the recording step of Step S103, the servo signal recording device 13 records a servo signal on the magnetic recording tape. The servo signal to be recorded may be, for example, as described in (1-1) of the above 1.

In the verification step of Step S104, the recorded servo signal is verified. The verification step is performed by the servo signal verifying device described in the above 1. The magnetic recording tape verified in Step S104 proceeds to a marking signal recording device (not shown) provided downstream of the servo signal verifying device 100 and upstream of the take-up roller 15. The detail of the verification step will be described below with reference to FIG. 11.

As shown in FIG. 11, the verification step of Step S105 includes a servo signal reading step S201, a first amplification step S202, a second amplification step S203, and the signal determination step S204.

In the servo signal reading step of Step S201, the servo signal verifying device 100, particularly, the servo signal reading head 101 of the servo signal verifying device, reads a servo signal of the magnetic recording tape. In the servo signal reading step, the voltage induced by the magnetic recording tape moving over the servo signal reading head 101 (particularly, over the head gap of the head 101) while contacting the head 101 can be obtained as a servo signal. The read servo signal is transmitted to the first amplifier 103 attached to the head 101 via the wiring 106.

In the first amplification step of Step S202, the first amplifier 103 amplifies the servo signal read by the servo signal reading head 101. A first amplified signal is obtained by the amplification. The first amplifier 103 that performs the first amplification step is favorably attached to the servo signal reading head 101. This reduces the effect on the servo signal due to, for example, jumping noise.

In the second amplification step of Step S203, the second amplifier 104 amplifies the first amplified signal. The second amplifier 104 includes a low-pass filter with a cutoff frequency of 35 MHz or less, favorably 30 MHz or less, more favorably 25 MHz or less, and still more favorably 20 MHz or less. This low-pass filter reduces the noise of the signal (second amplified signal) amplified by the second amplifier 104. By the noise reduction, it is possible to improve the S/N ratio. The second amplified signal is transmitted to the control unit (particularly, the signal determination unit 105) of the servo writer 1.

In the signal determination step of Step S204, the signal determination unit 105 of the control unit determines whether or not the servo signal has been normally recorded on the magnetic recording tape. After the determination, the verification step is terminated.

In the marking step of Step S105, the marking signal recording device records a marking signal according to the verification result on the magnetic recording tape. Then, the magnetic recording tape is wound by the take-up roller 15 to obtain a pancake-shaped magnetic recording tape on which a servo signal is recorded.

Note that the present technology provides also a servo signal verification method. The method can be performed using the servo signal verifying device described above. The method may include, for example, the servo signal reading step, the first amplification step, and the second amplification step described above. The method may further include the signal determination method described above.

4. Fourth Embodiment (Servo Signal Reading Head)

(1) First Example of Fourth Embodiment (Servo Signal Reading Head Including Amplifier)

The present technology provides also a servo signal reading head. The servo signal reading head is used to verify a servo signal written to a servo band of a magnetic recording tape and includes an amplifier that amplify the servo signal. Favorably, the amplifier is attached to the servo signal reading head. With the head including the amplifier, it is possible to reduce the effect on the servo signal due to jumping noise. The servo signal reading head and the amplifier are the servo signal reading head and the first amplifier described in (1) of the above 1, and the description also applies to this embodiment.

The servo signal reading head may be favorably used in conjunction with a different amplifier that further amplifies the signal obtained by amplifying the servo signal by the amplifier and includes a low-pass filter with a cutoff frequency of 35 MHz or less. The amplifier that performs the further amplification is the second amplifier described in (1) of the above 1, and the description also applies in this embodiment. By using the servo signal reading head in conjunction with the second amplifier, it is possible to verify the servo signal with high accuracy.

The servo signal reading head is suitable for reading a servo signal of a magnetic recording tape having a small magnetization amount. The servo signal reading head can be used to, for example, read the servo signal recorded on the magnetic recording tape described in (1) of the above 1.

In accordance with an embodiment of the present technology, the gap width of the head gap of the servo signal reading head may be constant. That is, the gap width may be constant from one end of the gap to the other end. A schematic diagram of a gap with a constant gap width is as shown in FIG. 7. An example of a more detailed configuration of the servo signal reading head according to this embodiment is as described in (1-3) of the above 1, and description thereof also applies to this embodiment.

In accordance with another embodiment of the present technology, the servo signal reading head may include a gap, the gap width of the center region being wider than the gap width of the both end portions in the gap. In this embodiment, the servo signal read by the servo signal reading head may be based on magnetic flux changes in gap portions of the end portions. More particularly, the servo signal is not based on magnetic flux changes in the gap portion of the central region. An example of a more detailed configuration of the servo signal reading head according to this embodiment is as described in (2) of the above 1, and description thereof also applies to this embodiment.

(2) Second Example of Fourth Embodiment (Servo Signal Reading Head where the Gap Width is not Constant)

The present technology provides also a servo signal reading head including a gap, the gap width of the center region being wider than the gap width of the both end portions in the gap. In this exemplary embodiment, the servo signal read by the servo signal reading head may be based on magnetic flux changes in gap portions of the both end portions as described in the above (1). More particularly, the servo signal is not based on magnetic flux changes in the gap portion of the central region. An example of a more detailed configuration of the servo signal reading head of this example is as described in (2) of the above 1, and description thereof also applies to this embodiment.

The servo signal reading head of this example is favorably used in conjunction with the first amplifier and the second amplifier described in (1-3) of the above 1. As a result, it is possible to accurately verify the servo signal of a magnetic recording tape having a narrow servo band width and a small magnetization amount originating from a servo band.

5. Example (1) Configuration of Prepared Servo Signal Verifying Device

Six different servo signal verifying devices were prepared. Hereinafter, these devices will be referred to as a device 1, a device 2, a device 3, a device 4, a device 5, and a device 6. The configurations of these devices will be described below.

The device 1 includes a servo signal reading head, a first amplifier that is attached to the head and amplifies a servo signal read by the head, and a second amplifier that amplifies a signal amplified by the first amplifier. The servo signal reading head was an inductive head and the gap depth of the head was 15 μm. The second amplifier does not include a low-pass filter.

The device 2 is the same as the device 1 except that the second amplifier includes a secondary low-pass filter having a cutoff frequency of 40 MHZ.

The device 3 is the same as the device 1 except that the second amplifier includes a secondary low-pass filter having a cutoff frequency of 35 MHZ.

The device 4 is the same as the device 1 except that the second amplifier includes a secondary low-pass filter having a cutoff frequency of 30 MHZ.

The device 5 is the same as the device 1 except that the second amplifier includes a secondary low-pass filter having a cutoff frequency of 20 MHZ.

The device 6 is the same as the device 1 except that the second amplifier includes a secondary low-pass filter having a cutoff frequency of 10 MHZ.

A magnetic recording tape was prepared. The magnetic recording tape contained barium ferrite as a magnetic powder in a magnetic layer and was intended for use in a product in the seventh generation of the LTO standard.

(2) Verification Processing and Evaluation Thereof

The device 1 was incorporated into a servo writer, and servo signal recording processing and verification processing were performed while causing the magnetic recording tape to travel at a tape speed of 5 m/s. The width of the servo band recorded in the servo signal recording processing was approximately 95.5 μm. The servo writer had the same configuration as that described in (1-2) of the above 1. In the verification processing, the servo signal read by the servo signal reading head was amplified by the first amplifier and the second amplifier. The signal obtained by the amplification is shown in Part (a) of FIG. 12.

Servo signal recording processing and verification processing were performed in the same manner as that when the device 1 was used, except that any of the devices 2 to 6 was used instead of the device 1. The signal obtained when using the device 2 is shown in Part (b) of FIG. 12. The signal obtained when using the device 3 is shown in Part (c) of FIG. 13. The signals obtained using the devices 4 and 5 are shown in Parts (d) and (e) of FIG. 14, respectively. The signal obtained when using the device 6 is shown in Part (f) of FIG. 15.

Figure 12:
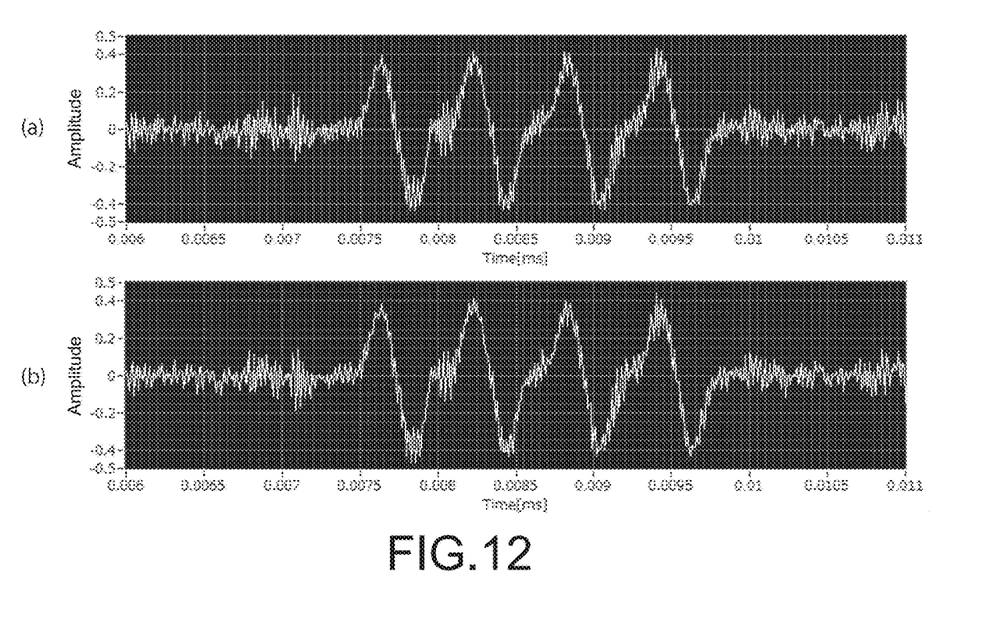
FIG. 12 is a diagram showing a signal obtained by a servo signal verifying device.

From the result shown in Part (a) of FIG. 12, in the device 1 including no low-pass filter, the noise is large and the noise is superimposed on the obtained signal. From the result shown in Part (b) of FIG. 12, even in the device 2 including a low-pass filter having a cutoff frequency of 40 MHZ, the noise was not sufficiently removed.

Figure 13:
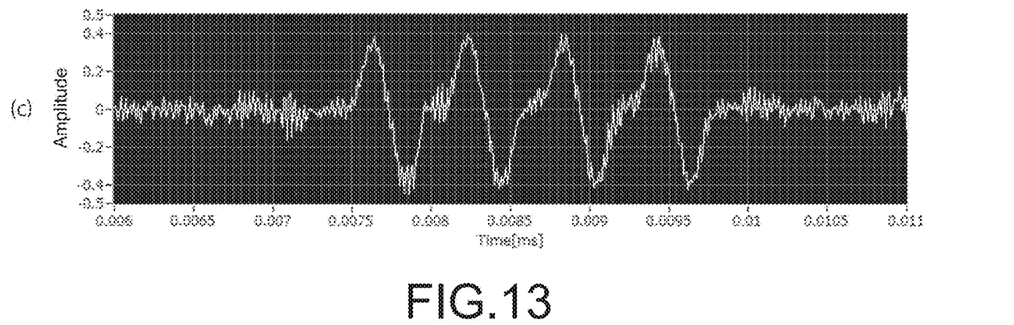
FIG. 13 is a diagram showing a signal obtained by the servo signal verifying device.
Figure 14:
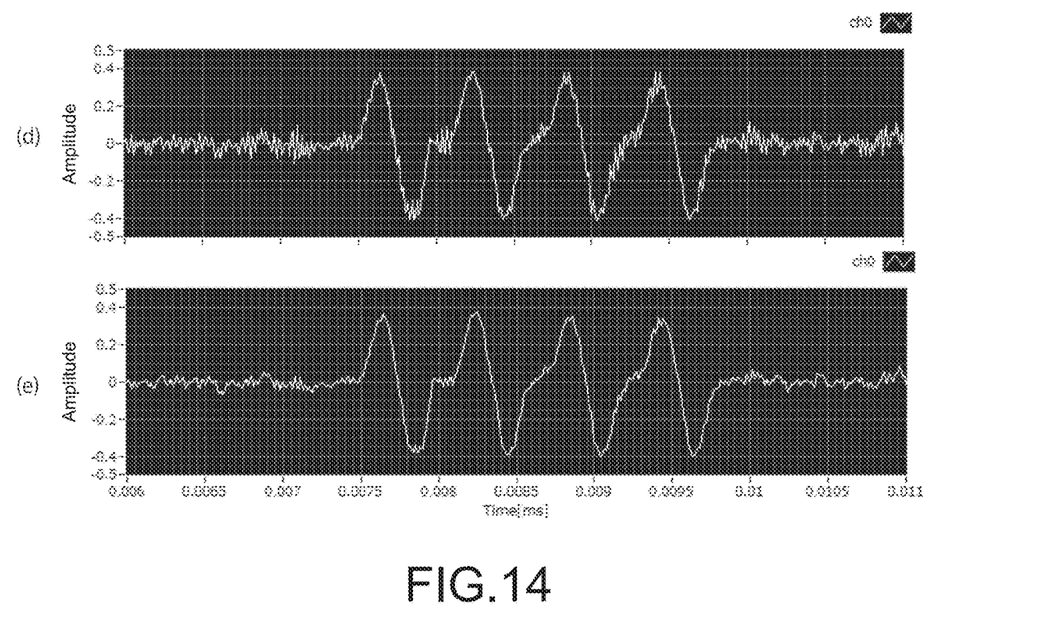
FIG. 14 is a diagram showing a signal obtained by the servo signal verifying device.
Figure 15:
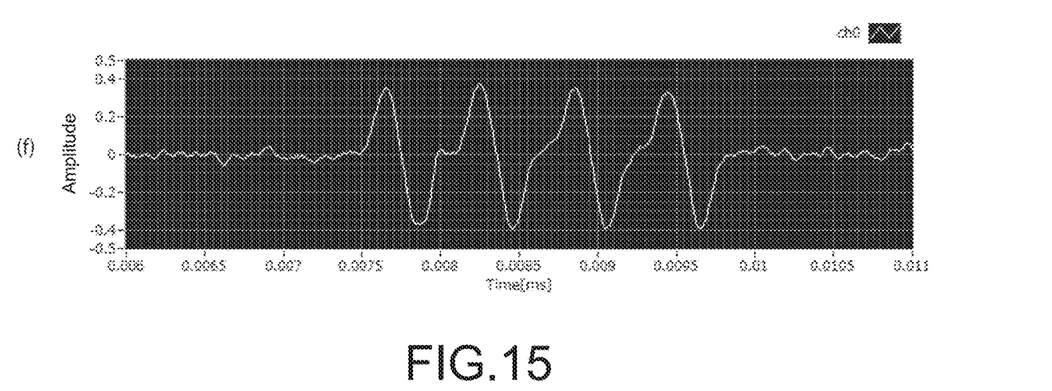
FIG. 15 is a diagram showing a signal obtained by the servo signal verifying device.

From the results shown in Part (c) of FIG. 13, Parts (d) and (e) of FIG. 14, and Part (f) of FIG. 15, it was found that when the cutoff frequency is 35 MHz or less, the noise was removed and a signal suitable for signal determination of the servo signal could be obtained. Further, the lower the cutoff frequency, the better the signal obtained.

From the above-mentioned results, it is understood that the servo signal verifying device according to the present technology is capable of accurately verifying a servo signal of a magnetic recording tape in which a servo band width is narrow and a magnetization amount originating from the servo band is small.

Figure 16:
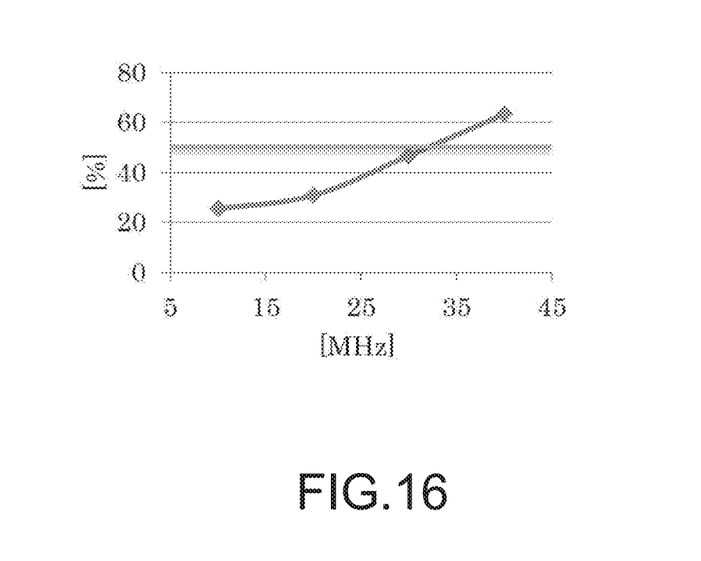
FIG. 16 is a diagram showing the ratio of the noise/servo signal output.

FIG. 16 shows the ratio of noise/servo output when the cutoff frequency is 40 MHz, 30 MHz, 20 MHz, and 10 MHz. In FIG. 16, the vertical axis indicates the ratio of the noise/servo output (ratio of noise to servo output), which means that the lower this ratio, the smaller the noise. In FIG. 16, the horizontal axis indicates the cutoff frequency.

For verification of a servo signal, the ratio of noise/servo output is favorably approximately 50% or 50% or less. It can be seen from FIG. 16 that a favorable noise/servo output ratio can be obtained when the cutoff frequency is approximately 35 MHz or 35 MHz or less.

Regarding the present technology described above, those skilled in the art will appreciate that various modifications, combinations, sub-combinations, or alternatives may be made within the scope of the present technology and equivalents thereof depending on, for example, design requirements or other factors.

It should be noted that the present technology may also take the following configurations.

[1] A servo signal verifying device, including:
  at least one servo signal reading head that reads a servo signal written to a servo band of a magnetic recording tape;
  a first amplifier that amplifies the servo signal read by the servo signal reading head; and
  a second amplifier that includes a low-pass filter with a cutoff frequency of 35 MHz or less and amplifies a signal amplified by the first amplifier.

[2] The servo signal verifying device according to [1], in which
  a depth of a gap of the servo signal reading head is 40 μm or less.

[3] The servo signal verifying device according to [1] or [2], in which
  the servo signal reading head is an inductive head.

[4] The servo signal verifying device according to any one of [1] to [3], in which
  a length of a wiring connecting the first amplifier and the servo signal reading head to each other is 10 cm or less.

[5] The servo signal verifying device according to any one of [1] to [4], in which
  the first amplifier is attached to the servo signal reading head.

[6] The servo signal verifying device according to any one of [1] to [5], in which
  a track width of the servo band is 150 μm or less.

[7] The servo signal verifying device according to any one of [1] to [6], in which
  the magnetic recording tape includes a magnetic layer containing barium ferrite.

[8] The servo signal verifying device according to any one of [1] to [7], in which
  of the gap of the servo signal reading head, a gap width of a center region is wider than gap widths of both end portions.

[9] The servo signal verifying device according to [8], in which
  the servo signal reading head reads a servo signal on a basis of magnetic flux changes in gap portions of both the end portions.

[10] A servo writer, including:
  a servo signal verifying device including
  at least one servo signal reading head that reads a servo signal written to a servo band of a magnetic recording tape,
  a first amplifier that amplifies the servo signal read by the servo signal reading head, and
  a second amplifier that includes a low-pass filter with a cutoff frequency of 35 MHz or less and amplifies a signal amplified by the first amplifier.

[11] A method of producing a magnetic recording tape on which a servo signal is recorded, including:
  a recording step of recording the servo signal on the magnetic recording tape; and
  a verification step of verifying the servo signal recorded in the recording step, in which
  the verification step is executed by using a servo signal verifying device including
  at least one servo signal reading head that reads a servo signal written to a servo band of the magnetic recording tape,
  a first amplifier that amplifies the servo signal read by the servo signal reading head, and
  a second amplifier that includes a low-pass filter with a cutoff frequency of 35 MHz or less and amplifies a signal amplified by the first amplifier.

[12] A servo signal reading head that is used to verify a servo signal written to a servo band of a magnetic recording tape, including:
  an amplifier that amplifies the servo signal.

[13] The servo signal reading head according to [12], which is used in conjunction with a different amplifier that further amplifies a signal obtained by the amplification of the servo signal by the amplifier and includes a low-pass filter with a cutoff frequency of 35 MHz or less.

[14] The servo signal reading head according to [12], in which
  a depth of a gap of the servo signal reading head is 40 μm or less.

[15] The servo signal reading head according to any one of [12] to [14], in which
  the servo signal reading head is an inductive head.

[16] The servo signal reading head according to any one of [12] to [15], in which
  the amplifier that amplifies the servo signal is attached to the servo signal reading head.

[17] The servo signal reading head according to any one of [12] to [16], in which
  the servo signal reading head includes a gap, a gap width of a center region being wider than gap widths of both end portions in the gap.

[18] The servo signal reading head according to [17], in which
  the servo signal reading head reads a servo signal on a basis of magnetic flux changes in gap portions of both the end portions.

REFERENCE SIGNS LIST 100 servo signal verifying device
101 servo signal reading head
102 head gap
103 first amplifier
104 second amplifier
105 signal determination unit

The invention claimed is:

1. A servo signal verifying device, comprising:
  at least one servo signal reading head that reads a servo signal written to a servo band of a magnetic recording tape;
  a first amplifier that amplifies the servo signal read by the servo signal reading head; and
  a second amplifier that includes a low-pass filter with a cutoff frequency of 35 MHz or less and amplifies a signal amplified by the first amplifier,
  wherein
  a depth of a gap of the servo signal reading head is 40 μm or less.

2. The servo signal verifying device according to claim 1, wherein
  the servo signal reading head is an inductive head.

3. A servo signal verifying device, comprising:
  at least one servo signal reading head that reads a servo signal written to a servo band of a magnetic recording tape;

a first amplifier that amplifies the servo signal read by the servo signal reading head; and a second amplifier that includes a low-pass filter with a cutoff frequency of 35 MHz or less and amplifies a signal amplified by the first amplifier, wherein a length of a wiring connecting the first amplifier and the servo signal reading head to each other is 10 cm or less.

4. The servo signal verifying device according to claim 1, wherein the first amplifier is attached to the servo signal reading head.

5. A servo signal verifying device, comprising:

at least one servo signal reading head that reads a servo signal written to a servo band of a magnetic recording tape;

a first amplifier that amplifies the servo signal read by the servo signal reading head; and a second amplifier that includes a low-pass filter with a cutoff frequency of 35 MHz or less and amplifies a signal amplified by the first amplifier, wherein a track width of the servo band is 150 μm or less.

6. The servo signal verifying device according to claim 1, wherein the magnetic recording tape includes a magnetic layer containing barium ferrite.

7. A servo signal verifying device, comprising:

at least one servo signal reading head that reads a servo signal written to a servo band of a magnetic recording tape;

a first amplifier that amplifies the servo signal read by the servo signal reading head; and a second amplifier that includes a low-pass filter with a cutoff frequency of 35 MHz or less and amplifies a signal amplified by the first amplifier, wherein of the gap of the servo signal reading head, a gap width of a center region is wider than gap widths of both end portions.

8. A servo signal verifying device, comprising:

at least one servo signal reading head that reads a servo signal written to a servo band of a magnetic recording tape;

a first amplifier that amplifies the servo signal read by the servo signal reading head; and a second amplifier that includes a low-pass filter with a cutoff frequency of 35 MHz or less and amplifies a signal amplified by the first amplifier, wherein the magnetic recording tape includes a magnetic layer containing barium ferrite, and wherein the servo signal reading head reads a servo signal on a basis of magnetic flux changes in gap portions of both the end portions.

9. A servo writer, comprising:

a servo signal verifying device including at least one servo signal reading head that reads a servo signal written to a servo band of a magnetic recording tape, a first amplifier that amplifies the servo signal read by the servo signal reading head, and a second amplifier that includes a low-pass filter with a cutoff frequency of 35 MHz or less and amplifies a signal amplified by the first amplifier, and wherein the servo writer further includes any one of the following:

wherein a depth of a gap of the servo signal reading head is 40 μm or less, wherein a length of a wiring connecting the first amplifier and the servo signal reading head to each other is 10 cm or less, wherein a track width of the servo band is 150 μm or less, wherein of the gap of the servo signal reading head, a gap width of a center region is wider than gap widths of both end portions, and wherein the servo signal reading head reads a servo signal on a basis of magnetic flux changes in gap portions of both the end portions and the magnetic recording tape includes a magnetic layer containing barium ferrite.

10. A method of producing a magnetic recording tape on which a servo signal is recorded, comprising:

a recording step of recording the servo signal on the magnetic recording tape; and a verification step of verifying the servo signal recorded in the recording step, wherein the verification step is executed by using a servo signal verifying device including at least one servo signal reading head that reads a servo signal written to a servo band of the magnetic recording tape, a first amplifier that amplifies the servo signal read by the servo signal reading head, and a second amplifier that includes a low-pass filter with a cutoff frequency of 35 MHz or less and amplifies a signal amplified by the first amplifier, and wherein the method further includes any one of the following:

wherein a depth of a gap of the servo signal reading head is 40 μm or less, wherein a length of a wiring connecting the first amplifier and the servo signal reading head to each other is 10 cm or less, wherein a track width of the servo band is 150 μm or less, wherein of the gap of the servo signal reading head, a gap width of a center region is wider than gap widths of both end portions, and wherein the servo signal reading head reads a servo signal on a basis of magnetic flux changes in gap portions of both the end portions and the magnetic recording tape includes a magnetic layer containing barium ferrite.

11. A servo signal reading head that is used to verify a servo signal written to a servo band of a magnetic recording tape, comprising:

an amplifier that amplifies the servo signal, wherein a depth of a gap of the servo signal reading head is 40 μm or less.

12. A servo signal reading head that is used to verify a servo signal written to a servo band of a magnetic recording tape, comprising:

an amplifier that amplifies the servo signal, wherein the servo signal reading head includes a gap, a gap width of a center region being wider than gap widths of both end portions in the gap.

13. The servo signal reading head according to claim 12, wherein the servo signal reading head reads a servo signal on a basis of magnetic flux changes in gap portions of both the end portions.

* * * * *